(12) United States Patent
Gordon et al.

(10) Patent No.: US 6,956,996 B2
(45) Date of Patent: Oct. 18, 2005

(54) TRI-STATE OPTICAL SYSTEMS AND METHODS

(75) Inventors: Gary B. Gordon, Saratoga, CA (US); Ken A. Nishimura, Fremont, CA (US); Jonathan Simon, Castro Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 178 days.

(21) Appl. No.: 10/184,584

(22) Filed: Jun. 27, 2002

(65) Prior Publication Data

US 2003/0202748 A1 Oct. 30, 2003

Related U.S. Application Data

(63) Continuation-in-part of application No. 10/133,818, filed on Apr. 24, 2002, now Pat. No. 6,754,417.

(51) Int. Cl.$^7$ .................................................. G02B 6/26
(52) U.S. Cl. .............................. 385/48; 385/31; 385/24
(58) Field of Search ............................ 385/48, 31, 24; 398/138, 139, 140–142, 214

(56) References Cited

U.S. PATENT DOCUMENTS

| | | | | |
|---|---|---|---|---|
| 4,389,085 A | * | 6/1983 | Mori | 359/591 |
| 4,472,628 A | * | 9/1984 | Whitten | 250/227.14 |
| 4,866,694 A | * | 9/1989 | Korth | 369/44.12 |
| 4,945,527 A | * | 7/1990 | Sunagawa | 369/44.12 |
| 5,009,483 A | * | 4/1991 | Rockwell, III | 385/116 |
| 5,081,615 A | * | 1/1992 | Sunagawa | 369/44.12 |
| 5,105,293 A | * | 4/1992 | Bortolini | 398/141 |
| 5,122,893 A | | 6/1992 | Tolbert | |
| 5,237,441 A | * | 8/1993 | Nhu | 398/136 |
| 5,499,309 A | * | 3/1996 | Kozuka et al. | 385/38 |
| 5,528,399 A | * | 6/1996 | Izumi et al. | 349/116 |
| 5,793,511 A | * | 8/1998 | Bulow | 398/147 |
| 5,963,349 A | | 10/1999 | Norte | |
| 6,477,296 B1 | * | 11/2002 | Ogawa | 385/31 |
| 6,480,639 B2 | * | 11/2002 | Hashimoto et al. | 385/14 |
| 6,574,022 B2 | * | 6/2003 | Chow et al. | 385/14 |

FOREIGN PATENT DOCUMENTS

| | | |
|---|---|---|
| EP | 0323074 | 7/1989 |
| GB | 2328818 | 3/1999 |

OTHER PUBLICATIONS

"Optical Fiber Tap Capable of Random Placement Along an Optical Fiber," U.S. Appl. No. 10/133,818, filed Apr. 24, 2002.

* cited by examiner

Primary Examiner—Ellen E. Kim

(57) ABSTRACT

Optical systems are provided. A representative optical system includes an optical transceiver with an optical source and an optical receiver. The system also includes an optical bus. At least one of the optical source and the optical receiver is optically coupled to an intermediate portion of the optical bus. The optical source provides optical signals for propagation by the optical bus, and the optical receiver detects optical signals differentially. Methods and other systems also are provided.

23 Claims, 7 Drawing Sheets

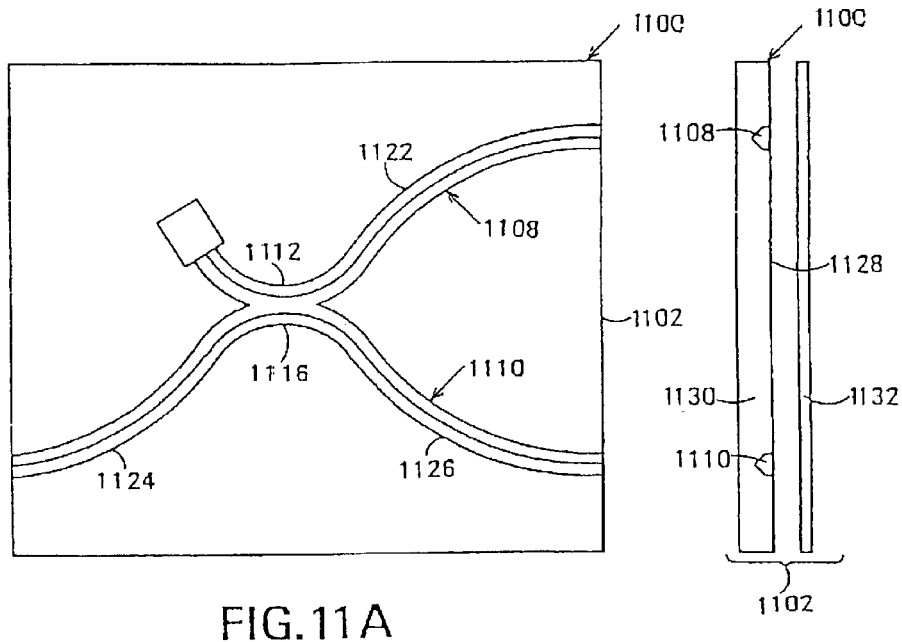
FIG.11A
FIG.11B
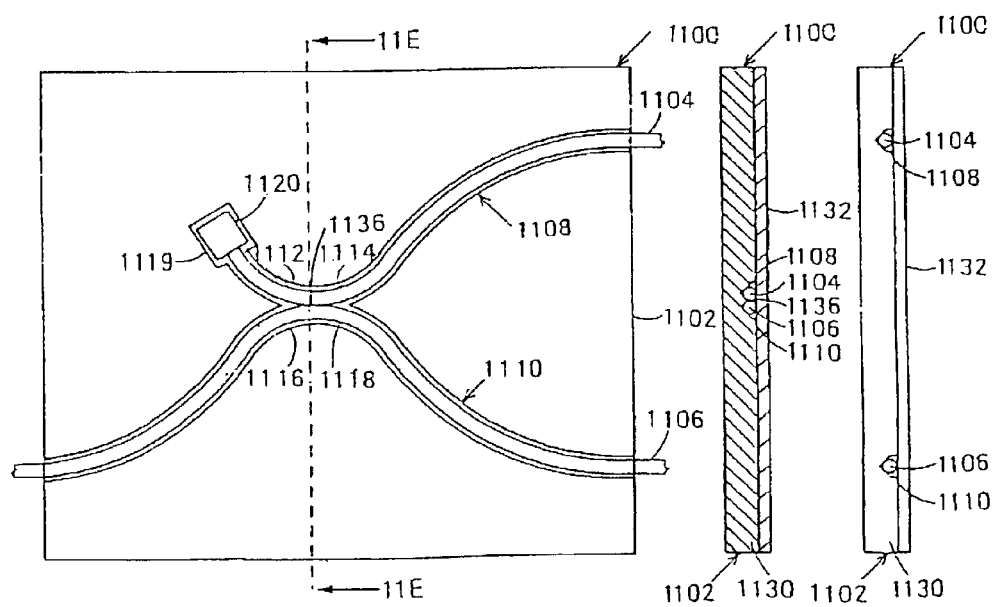
FIG.11C
FIG. 11E
FIG. 11D

TRI-STATE OPTICAL SYSTEMS AND METHODS

CROSS REFERENCE TO RELATED APPLICATION

This Application is a Continuation-In-Part Application, claiming the benefit of and priority to U. S. patent application Ser. No. 10/133,818 (10004342-1), filed on Apr. 24, 2002 U.S. Pat. No. 6,754,417, which is incorporated herein by reference.

FIELD OF THE INVENTION

The present invention generally relates to data communication and, more particularly, to systems and methods involving the use of optical busses for communicating optical data signals.

DESCRIPTION OF THE RELATED ART

The desire for increasing data-handling capacity has resulted in a trend toward using optical signals for communicating data. Because of this, much effort has been devoted to producing optical analogues of electrical data-communicating components. By way of example, optical fiber is used as a transmission medium for propagating optical signals, whereas copper wire typically is used to propagate electrical signals.

As is known, electrical busses usually are used for communicating electrical data signals between various components of electrical systems. Often, these busses are tri-state busses, i.e., such a bus can be driven "high" (representative of a logic "1"), "low" (representative of a logic "0") or can exhibit a state not associated with a logic value. Tri-state busses are particularly useful because multiple components can provide data to such a bus. For example, if a memory module electrically coupled to a tri-state electrical bus applies 0.1 volts (drives the bus "low") or 2.8 volts (drives the bus "high") to the bus, the voltage level of the bus adjusts to the applied voltage level. Therefore, a receiver that is electrically coupled to the bus is presented with an unambiguous voltage level for decoding. Further, when the bus is not being driven high or low by the memory module, the bus can be driven by another component that is electrically coupled to the bus.

Unfortunately, optical analogues of tri-state electrical busses are not readily available. This is because attempts to couple optical signals onto and off of an optical fiber typically exhibit considerable and unpredictable attenuation, which makes decoding of the optical signals difficult. This deficiency is compounded by the fact that many optical sources are not turned fully off, even when data transmission from the optical source is discontinued. In particular, many optical sources are placed in a low-level modulation state that enables the optical source to produce optical energy, but at an intensity level lower than that associated with an optical data signal. By placing the optical source in the low-level modulation state, the optical source can more quickly be placed in a high-level modulation state for producing optical data signals. Therefore, increased data rates can be achieved. However, it can become ambiguous as to whether the intensity level of an optical signal from such an optical source is associated with a low-level modulation state or a high-level modulation state that has suffered attenuation.

Based on the foregoing, it should be understood that there is a need of improved systems and methods that address these and/or other perceived shortcomings of the prior art.

SUMMARY OF THE INVENTION

The present invention involves the use of optical busses for communicating optical data signals. In particular, optical data signals can be provided to and received from the optical busses at various locations along the lengths of the busses. This enables components, such as optical transceivers, to be optically coupled to the busses at locations other than the ends of the busses. Since optical data signals can be received from such an optical bus at several locations, optical data signals propagating through the bus typically are attenuated at each such location. Because of this, differential detection techniques in accordance with the invention can be used to detect the optical data signals.

An optical system in accordance with the invention includes an optical transceiver that incorporates an optical source and an optical receiver. The optical receiver is operative to detect optical signals differentially. The system also includes an optical bus that has a first end and a second end, and an intermediate portion defined between the first end and the second end. At least one of the optical source and the optical receiver is optically coupled to the intermediate portion of the optical bus. The optical source is operative to provide optical signals for propagation by the optical bus.

A method in accordance with the invention for communicating optical signals includes: providing an optical bus having a first end and a second end, and an intermediate portion defined between the first end and the second end; providing an optical transceiver having an optical receiver and an optical source, the optical receiver being operative to detect optical signals differentially; and optically coupling at least one of the optical receiver and the optical source to the intermediate portion of the optical fiber.

Clearly, embodiments of the invention may exhibit features and/or advantages in addition to, or in lieu of, those mentioned above. Additionally, other systems, methods, features and/or advantages of the present invention will be or may become apparent to one with ordinary skill in the art upon examination of the following drawings and detailed description. It is intended that all such additional systems and/or methods be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 11A and 11B are respectively a top view and a side view of a first embodiment of an optical fiber tap according to the invention.

FIGS. 11C and 11D are respectively a top view and a side view of the optical fiber tap shown in FIGS. 11A and 11B with the branch optical fiber and the main optical fiber installed in the branch channel and the main channel, respectively.

FIG. 11E is a cross-sectional view along the line 11E—11E in FIG. 11C of the optical fiber tap shown in FIGS. 11C and 11D.

DETAILED DESCRIPTION

Figure 1:
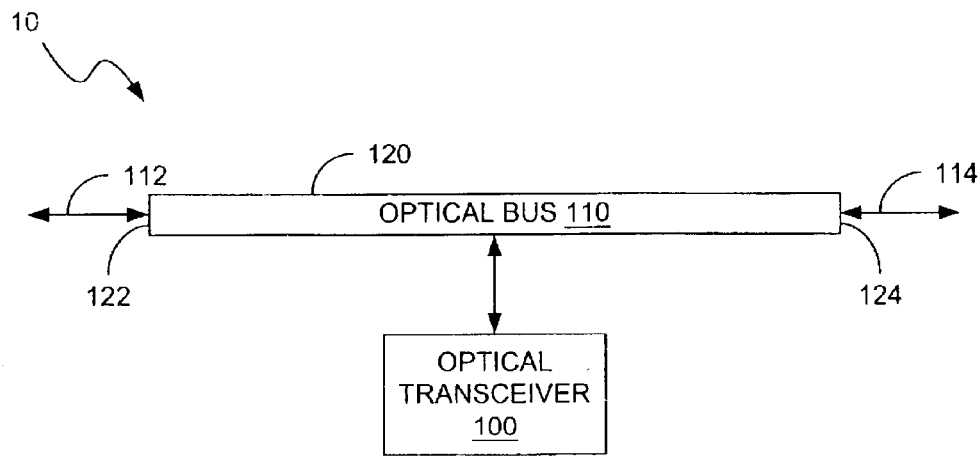
FIG. 1 is a schematic diagram of an embodiment of an optical system in accordance with the present invention.

Referring now to the drawings, FIG. 1 is a schematic diagram depicting an embodiment of an optical system 10 in accordance with the present invention. As shown in FIG. 1, optical system 10 includes an optical transceiver 100 and an optical bus 110. Optical bus 110 propagates optical signals, which are represented by the bidirectional arrows 112 and 114.

Optical transceiver 100 is optically coupled to optical bus 110. More specifically, at least a portion of the optical transceiver 100 is optically coupled to an intermediate portion 120 of the optical bus 110, i.e., that portion defined between the first and second ends 122, 124 of the bus. Thus, at least a portion of the optical transceiver 100 is not end-coupled to the optical bus 110. Note, optical bus 110 can be formed of various components such as optical fibers, buried waveguides and planar waveguides. In the exemplary embodiments that follow, optical fibers will be used as the optical busses. There is no intention, however, to limit the invention to this particular type of bus.

Optical signals propagating through the optical bus 110 typically are attenuated at each junction formed between an optical transceiver and the bus. Optical transceivers identify the logic states of these attenuated optical signals. In this regard, optical bus 110 typically propagates two optical signals that exhibit frequency diversity. Optical transceiver 100 differentially detects the optical signals propagated by optical bus 110. That is, when portions of the optical signals are received by the optical transceiver 100, the optical transceiver determines which of the two optical signals exhibits a higher or, alternatively, lower, intensity than the other. For instance, by assigning a logic "1" to one of the optical signals and a logic "0" to the other of the optical signals, determining which of the signals exhibits the higher intensity identifies the logic state of the data carried by the optical signals.

Figure 2:
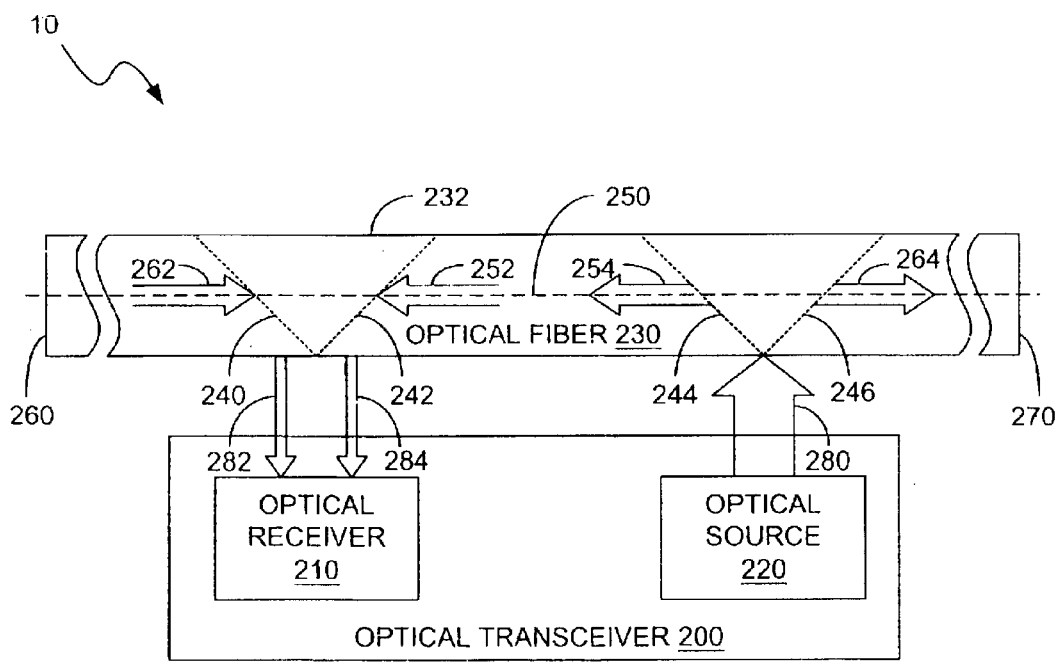
FIG. 2 is a schematic diagram of another embodiment of an optical system in accordance with the present invention.

Another embodiment of an optical system 10 in accordance with the present invention is depicted schematically in FIG. 2. As shown in FIG. 2, optical system 10 includes an optical transceiver 200 that incorporates an optical receiver 210 and an optical source 220. Optical system 10 also includes an optical fiber 230 that is optically coupled to the optical transceiver 200. In particular, both the optical receiver 210 and optical source 220 are optically coupled to an intermediate portion 232 of the optical fiber.

Optical fiber 230 includes reflective surfaces 240, 242, 244 and 246 that are inclined with respect to a propagation axis 250 of the fiber. These reflective surfaces optically couple the optical transceiver 200 and the optical fiber 230. Note, in FIG. 2, several optical signals are depicted. In particular, arrows 252 and 254 represent optical signals propagating through the optical fiber toward a first end 260 of the fiber, and arrows 262 and 264 represent optical signals propagating toward a second end 270 of the fiber. The reflective surfaces 240 and 242 reflect optical signals 262 and 252, respectively, toward the optical receiver 210. The reflective surfaces 244 and 246 receive optical signals 280 from the optical source 220, and divide and reflect the optical signal 280 to produce optical signals 254 and 264.

Note, arrows 282 and 284, which represent the optical signals propagated from the optical fiber 230 to the optical receiver 210, are smaller than the arrows representing optical signals 262 and 252. This is because only a portion of an optical signal propagating through optical fiber 230 typically is reflected by a reflective surface (240, 242) and directed to the optical receiver 210. Likewise, arrows 254 and 264 are smaller than the arrow representing optical signal 280, which is provided by the optical source 220. This is because the optical signal 280 is divided to form the optical signals 254 and 264.

Reflective surfaces 244 and 246 and optical source 220 can be arranged in various configurations to establish how much of the optical signal 280 is to be reflected by each of the reflective surfaces and, thus, the relative intensity of optical signals 254 and 264. Also note that, in some embodiments, a reflective surface can reflect all of the optical signals that are incident thereupon. In such an embodiment, the optical signals do not propagate beyond the reflective surface for continued propagation along the optical fiber.

Different types and arrangements of reflective surfaces can be used. For instance, in some embodiments, a material exhibiting a different index of refraction than that of the optical fiber can be arranged in the fiber. For example, silver could be used. Such a material could form a layer that is inclined with respect to the propagation axis of the fiber to cause optical signals to reflect from the layer to a location offset with respect to the propagation axis. Note, the angle of inclination formed between the propagation axis of the fiber and a reflective surface is selected to ensure that an optical signal is directed either from the optical fiber and to the optical transceiver or vice versa. In some embodiments, the layer can function as a unidirectional reflector (one-way mirror) that reflects optical signals incident upon one side of the layer, while enabling optical signals to pass through the layer from the other side.

In order to form a reflective surface, an optical fiber can be divided into segments, such as by cutting the fiber to form ends that are inclined with respect to the propagation axis of the fiber. One or more of the ends then can be used to form reflective surfaces. For example, an end can be coated and/or surrounded by a material exhibiting a different index of refraction than the optical fiber so that optical signals reflect from the end. As another example, the ends then could be optically re-coupled to provide a reflective surface located at an intermediate portion of the fiber.

In order for optical signals that have been reflected by a reflective surface to propagate to an optical transceiver, the optical signals typically propagate through the side of the optical fiber. Since an optical fiber typically uses a cladding formed about the core of the fiber to maintain propagation of the optical signals along the fiber, the optical fiber used typically exhibits a discontinuity in the cladding. By way of example, an optical fiber with a continuous cladding may be modified, such as by chemically treating the fiber to remove a portion of the cladding or by mechanically removing (nipping away) a portion of the cladding, so that a discontinuity is formed. Optical signals then can be directed from the optical fiber at the location of the discontinuity.

Figure 3:
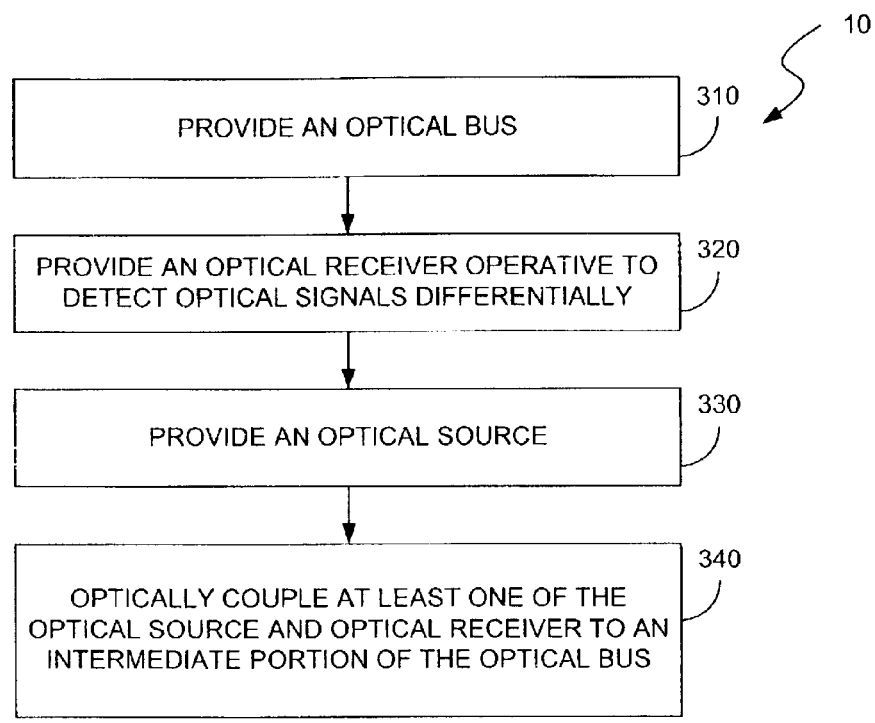
FIG. 3 is flowchart depicting functionality of the embodiment of FIG. 2.

Referring now to the flowchart of FIG. 3, functionality of the embodiment of the optical system 10 of FIG. 2 will be described. As shown in FIG. 3, the functionality (or method) may be construed as beginning at block 310, where an optical bus is provided. In blocks 320 and 330, an optical receiver and an optical source, respectively, are provided. In particular, the optical receiver detects optical signals differentially. Thereafter, as depicted in block 340, at least one of the optical receiver and optical source is optically coupled to an intermediate portion of the optical fiber.

Figure 4:
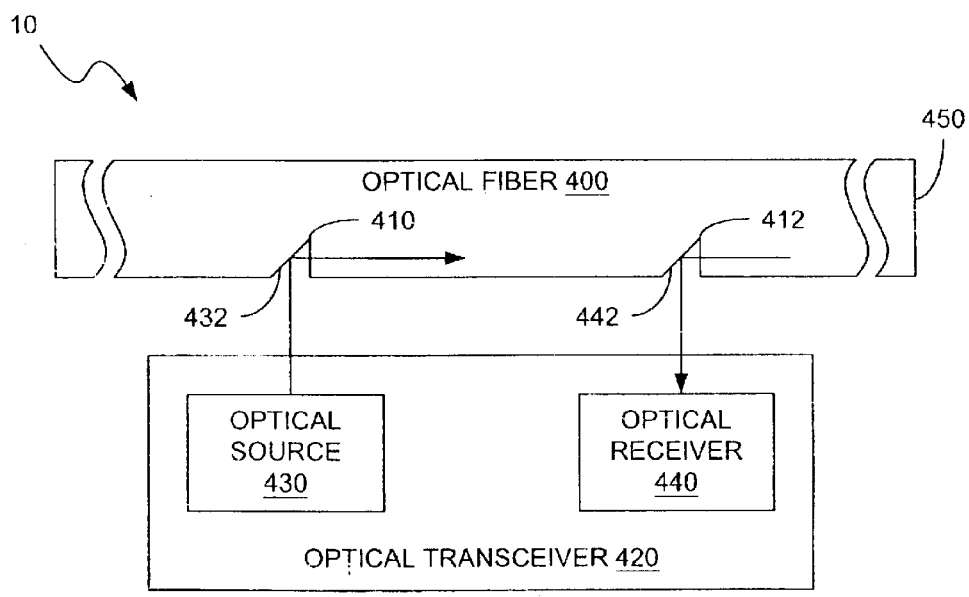
FIG. 4 is a schematic diagram of another embodiment of an optical system in accordance with the present invention.

As shown in FIG. 4, shaped notches called "facets" can form discontinuities in the cladding of an optical fiber as well as reflective surfaces for directing optical signals. More specifically, optical fiber 400 of FIG. 4 includes facets 410 and 412. Optical transceiver 420 is optically coupled to the fiber via the facets. In particular, optical source 430 is optically coupled to the fiber via facet 410, which includes a reflective surface 432. Optical receiver 440 is optically coupled to the optical fiber via facet 412, which includes a reflective surface 442. As mentioned before with respect to forming a discontinuity in the cladding of an optical fiber, the facets can be chemically and/or mechanically formed, for example. Note that in the embodiment of FIG. 4, optical system 10 directs optical signals toward and receives optical signals from only one end, i.e., end 450, of the optical fiber.

Figure 5:
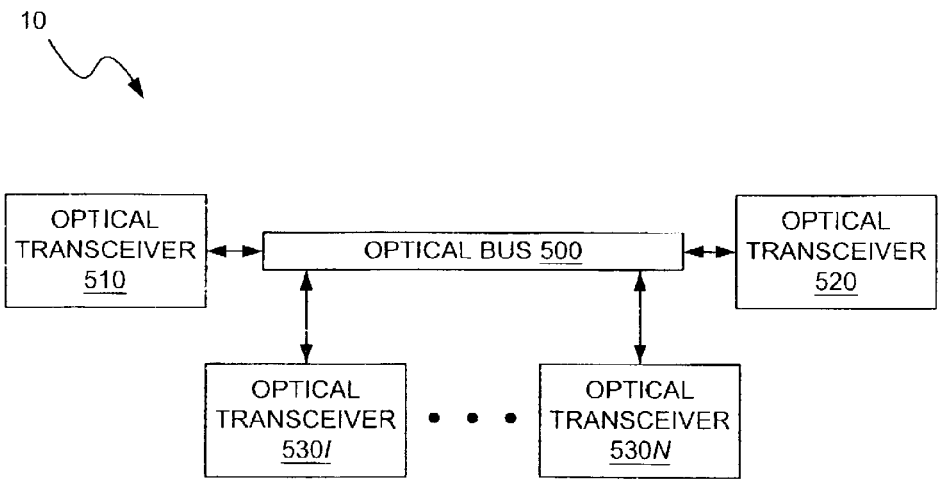
FIG. 5 is a schematic diagram of another embodiment of an optical system in accordance with the present invention.

FIG. 5 is a schematic diagram depicting another embodiment of an optical system 10 in accordance with the present invention. As shown in FIG. 5, optical system 10 includes an optical bus 500 and multiple optical transceivers. More specifically, optical transceiver 510 is optically coupled to end 512 of the optical bus, and optical transceiver 520 is optically coupled to end 522. Optical transceivers 530I through 530N also are optically coupled to optical bus 500. In particular, at least a portion of each of the optical transceivers 530I–530N is optically coupled to an intermediate portion 532 of the optical bus.

Optical bus 500 propagates optical signals received from the optical transceivers. In some embodiments, at least one of the optical transceivers provides two optical signals to the bus that exhibit frequency diversity. At least one of the optical transceivers differentially detects the optical signals propagated by optical bus 500. In such an embodiment, the optical signal detected with the highest intensity is attributed to the propagated data value. By way of example, if a first of the signals corresponds to a logic "1" and a second of the signals corresponds to a logic "0," and the first signal is detected at a higher intensity than the second signal, the propagated data value is interpreted as a logic "1."

In other embodiments, one or more of the optical sources coupled to a bus may only be able to provide one optical signal to the bus at a time. For instance, when a logic "1" is transmitted, an optical signal of one frequency is produced by the transceiver, whereas, when a logic "0" is transmitted, an optical signal of another frequency is produced. Clearly, differential detection can be used to determine the data values of these optical signals.

Figure 6:
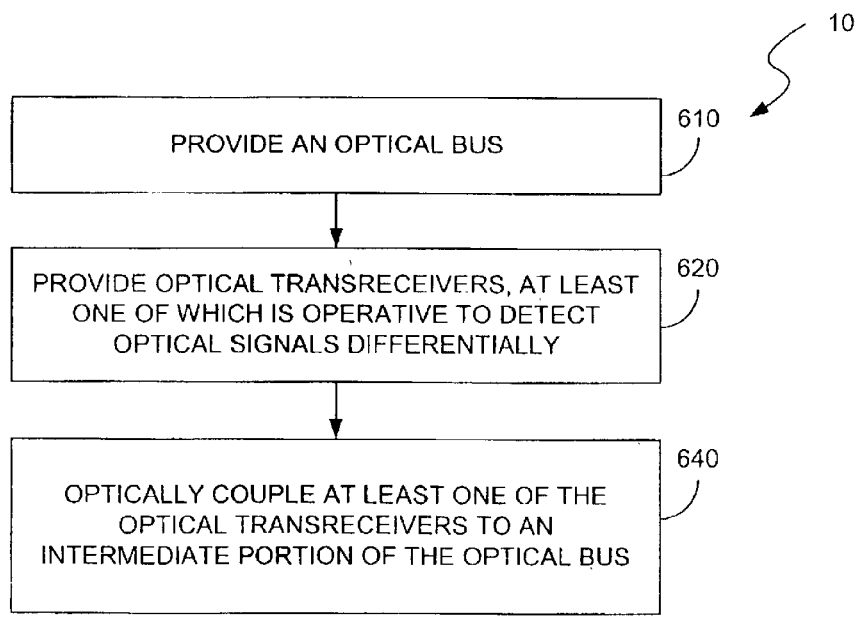
FIG. 6 is flowchart depicting functionality of the embodiment of FIG. 5.

Functionality of the embodiment of the optical system 10 of FIG. 5 will now be described with reference to the flowchart of FIG. 6. As shown in FIG. 6, the functionality (or method) may be construed as beginning at block 610, where an optical bus is provided. In blocks 620, multiple optical transceivers are provided. More specifically, at least one of the optical transceivers is operative to detect optical signals differentially. Thereafter, as depicted in block 630, at least one of the optical transceivers is optically coupled to an intermediate portion of the optical bus.

Figure 7:
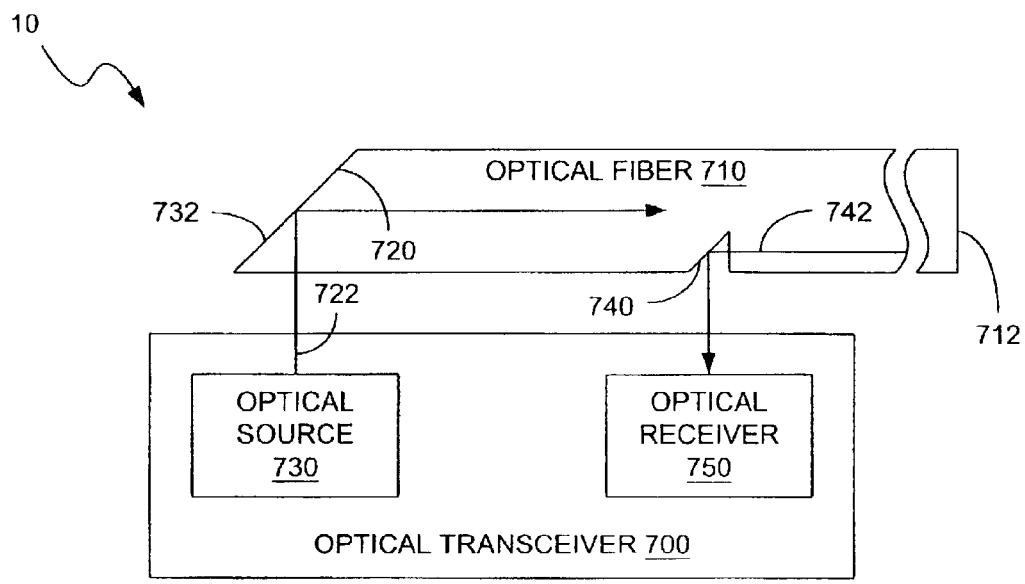
FIG. 7 is a schematic diagram of another embodiment of an optical system in accordance with the present invention.

Another embodiment of an optical system in accordance with the invention is depicted in FIG. 7. In FIG. 7, optical system 10 includes an optical transceiver 700 that is optically coupled to an optical fiber 710. Optical transceiver 700 directs optical signals toward and receives optical signals directed from a first end 712 of the optical fiber 710. In particular, a first reflective surface 720 of the optical fiber receives optical signal 722 from optical source 730, and directs the optical signal 722 toward the first end of the fiber. Additionally, a reflective surface 740 receives optical signal 742 propagating from the first end 712, and directs this optical signal to optical receiver 750.

Note, the first reflective surface 720 is formed by an inclined end surface 732 of the optical fiber. Inclined end surface 732 can be formed by cleaving the optical fiber, for example.

Figure 9:
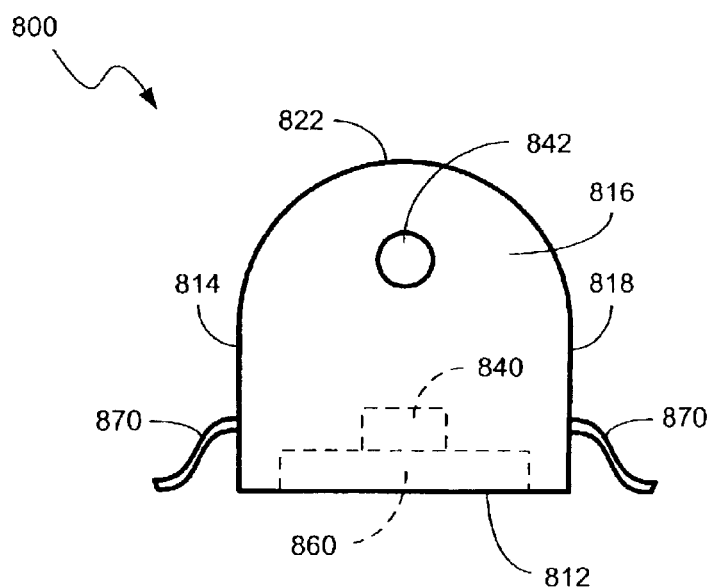
FIG. 9 is a side elevational view of the optical transceiver of FIG. 6.
Figure 8:
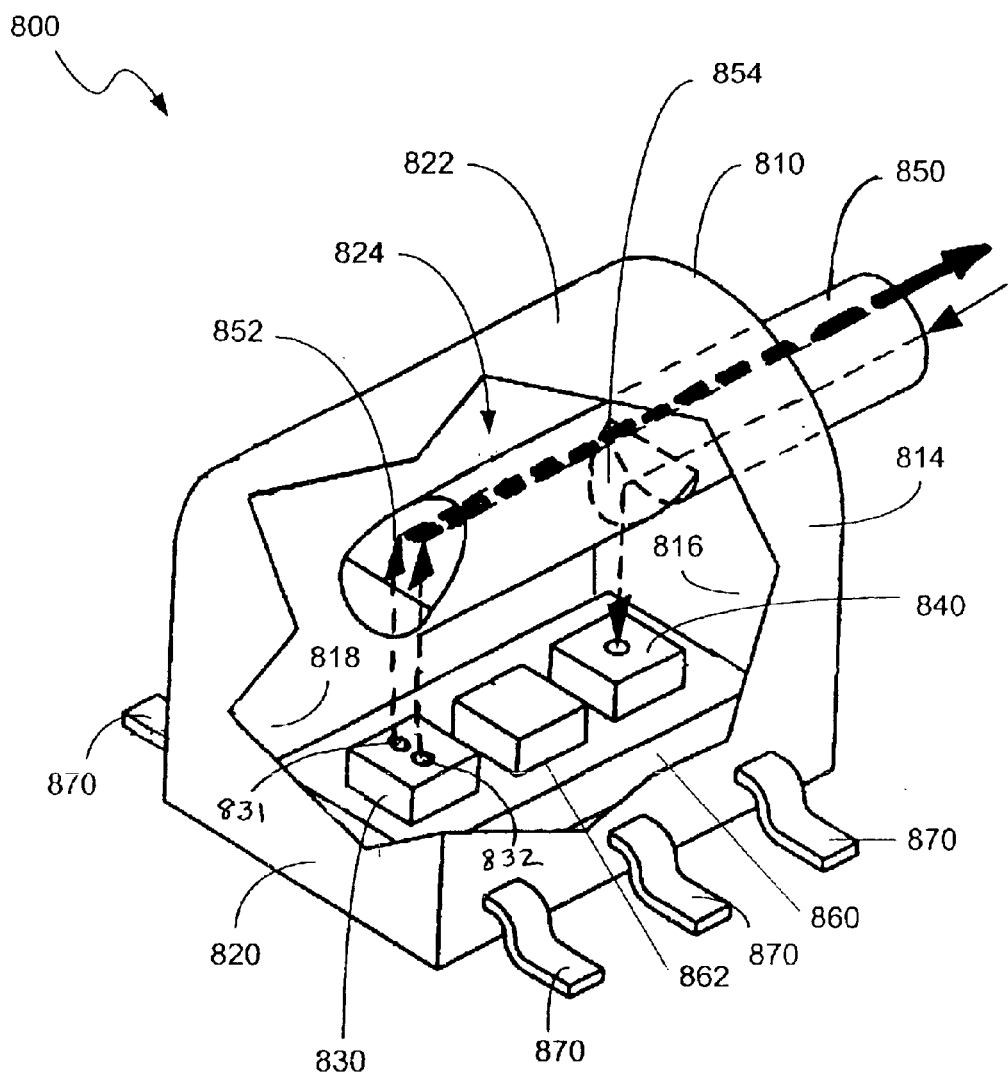
FIG. 8 is a partially cut-away, perspective view of an embodiment of an optical transceiver in accordance with the present invention.

Reference will now be made to FIGS. 8 and 9, which depict an embodiment of an optical transceiver in accordance with the invention. As shown in FIG. 8, which is a partially cut-away, perspective view, optical transceiver 800 includes a housing 810. Housing 810 incorporates a base 812 and sidewalls 814, 816, 818 and 820 extending upwardly from the base. Sidewalls 814 and 818 merge to form a curved upper surface 822 of the housing. Housing 810 also defines an interior 824 within which an optical source 830 and an optical receiver 840 are arranged.

As shown in FIG. 9, sidewall 816 defines an aperture 842 that is sized and shaped for receiving an end as well as an intermediate portion of an optical fiber. In this regard, an optical fiber 850 is depicted in FIG. 8 as being inserted within the aperture. Insertion of the fiber within the aperture positions the fiber so that the propagation axis of the fiber is offset with respect to the optical source and optical receiver. The sidewall 816 supports the optical fiber in this position.

Optical source 830 produces two optical signals that are frequency diverse with respect to each other. More specifically, when the transceiver is to transmit a logic "0," source 830 produces a first optical signal that is propagated from aperture 831. When the transceiver is to transmit a logic "1," source 830 produces a second optical signal that is propagated from aperture 832.

Optical receiver 840 differentially detects optical signals received from the optical fiber 850. In particular, the receiver differentially detects optical signals that exhibit the same frequencies as the first and second signals produced by the optical source 830. In response to detecting the optical signals, the optical receiver outputs electrical signals indicative of the determined logic values.

Optical fiber 850 includes reflective surfaces 852 and 854. Reflective surface 852 is aligned with optical source 830 and optically couples the optical source to the fiber. Likewise, reflective surface 854, which is formed by a facet, is aligned with optical receiver 840 and optically couples the optical receiver to the fiber.

Optical source 830 and optical receiver 840 are supported by a substrate 860 that also is used to support control circuitry 862. The control circuitry receives electrical signals via one or more pins 870. In response to the electrical signals, the control circuitry provides a control input to the optical source so that the optical source can generate optical signals for propagation to optical fiber 850. The control circuitry also can control the flow of data from the optical transceiver. In this respect, the optical receiver receives optical signals and converts the optical signals into electrical signals. The electrical signals then are provided to the pins in response to control signals from the control circuitry. In some embodiments, an analog-to-digital converter can be included for converting the analog electrical signals to digital signals.

Figure 10:
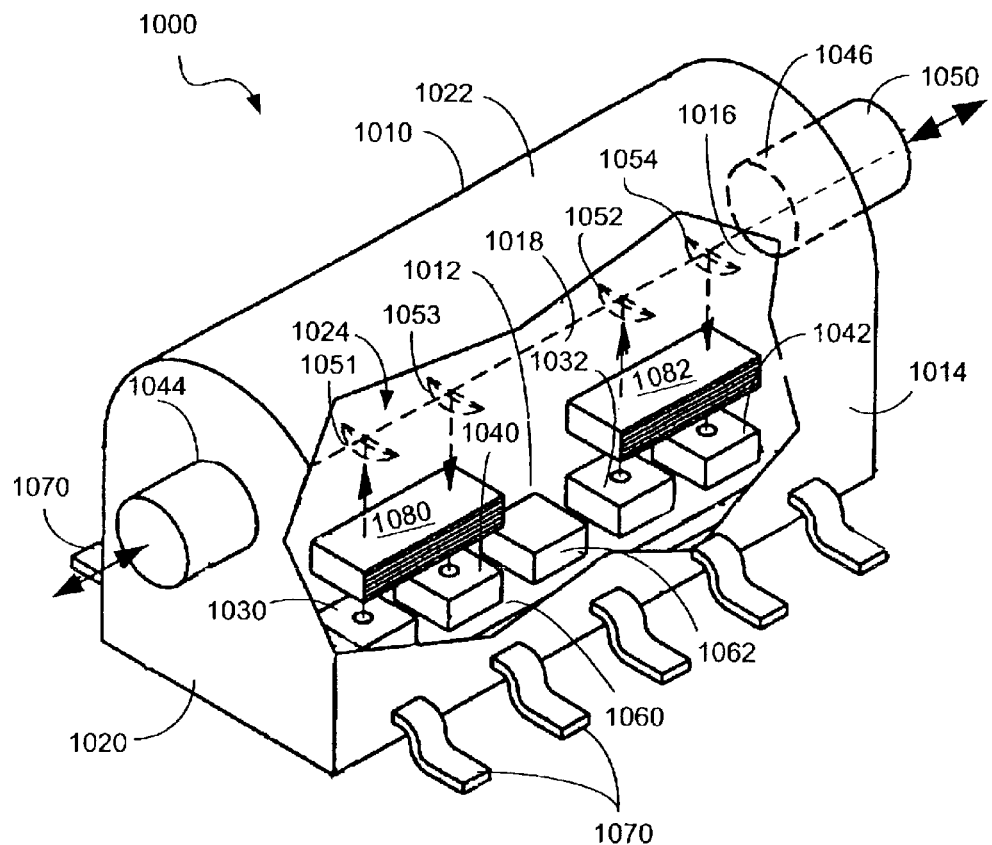
FIG. 10 is a partially cut-away, perspective view of another embodiment of an optical transceiver in accordance with the present invention.

Another embodiment of an optical transceiver in accordance with the invention is depicted in FIG. 10. As shown in FIG. 10, which is a partially cut-away, perspective view, optical transceiver 1000 includes a housing 1010. Housing 1010 incorporates abase 1012 and sidewalls 1014, 1016, 1018 and 1020 extending upwardly from the base. Sidewalls 1014 and 1018 merge to form a curved upper surface 1022 of the housing. Housing 1010 also defines an interior 1024 within which optical sources 1030 and 1032, and optical receivers 1040 and 1042 are arranged.

Sidewalls 1016 and 1020 define aperture 1044 and 1046, respectively, that are sized and shaped for receiving optical fiber 1050 (only a portion of which is depicted for clarity). Insertion of the fiber within the apertures positions the fiber so that the propagation axis of the fiber is offset with respect to the optical sources and optical receivers.

Optical fiber 1050 includes reflective surfaces 1051 and 1052, each of which is aligned with an optical source, and reflective surfaces 1053 and 1054, each of which is aligned with one of the optical receivers. Note, in FIG. 10, the reflective surfaces are facets that optically couple the optical sources 1030, 1032 and receivers 1040, 1042 to the fiber.

The optical sources 1030, 1032 and optical receivers 1040, 1042 are supported by a substrate 1060 that also is used to support control circuitry 1062. The control circuitry receives electrical signals via one or more pins 1070. In response to the electrical signals, the control circuitry provides control inputs to the optical sources 1030, 1032 so that the optical sources can generate optical signals for propagation to optical fiber 1050. Note, the optical sources 1030, 1032 produce optical signals that are frequency diverse.

In FIG. 10, band pass filters 1080 and 1082 are used to filter the optical signals. More specifically, filter 1080 is arranged between the fiber and receiver 1040, and filter 1082 is arranged between the fiber and receiver 1042. The filters 1080, 1082 ensure that optical signal detectable by the receivers are provided to the receivers 1040, 1042.

The filters 1080, 1082 also can be used to provide optical signals of selected frequencies to the optical fiber. For instance, in FIG. 10, each filter receives optical signals from a corresponding source, and filters all but a select frequency provided by each of the sources. Thus, each of the optical sources 1030, 1032 can produce multiple frequencies of optical signals that are filtered before being provided to the optical fiber. In other embodiments, each of the optical sources is operative to produce only a single frequency signal.

The control circuitry also controls the flow of data from the optical transceiver 1000. In this respect, each of the optical receivers 1040, 1042 receives optical signals from fiber 1050 and converts the optical signals into electrical signals. The electrical signals then are provided to a comparator of the control circuitry so that the relative intensity of the signals can be determined. The output of the comparator then can be used to provide a digital output signal that is routed from the transceiver via pins 1070.

Optical coupling of an optical transceiver to an optical bus also can be accomplished without using reflective surfaces of an optical bus. For example, bending an optical fiber lengthways into an arc having a radius less than a critical radius will allow light to pass laterally through the cladding of the optical fiber into and out of the core of the optical fiber, and will thus allow an optical signal to be coupled into and out of the optical fiber. A curved portion of an optical fiber having a radius of curvature less than the critical radius will be called a coupling curve.

The optical fiber tap according to the invention is composed of a housing, a serpentine main channel and a branch channel. Both the main channel and the branch channel are defined in the housing. The main channel is shaped to accommodate part of the main optical fiber, and includes a coupling curve portion that is shaped to define a coupling curve in the main optical fiber. The branch channel is shaped to accommodate part of the branch optical fiber and communicates with the main channel at the coupling curve portion of the main channel. Optical signals are coupled laterally between a portion of a main optical fiber installed in the main channel and a portion of a branch optical fiber installed in the branch channel where the main channel and the branch channel communicate.

FIGS. 11A and 11B are a top view and a side view, respectively, of a first embodiment 1100 of an optical fiber tap according to the invention. In the first embodiment, the branch channel is also serpentine and includes a coupling curve portion opposed to and juxtaposed with the coupling curve portion of the main channel. The coupling curve portion of the branch channel defines a coupling curve in the branch optical fiber. Optical signals are coupled laterally between juxtaposed coupling curves defined in the main optical fiber installed in the main channel and the branch optical fiber installed in the branch channel.

The optical fiber tap 1100 is composed of the housing 1102 that includes the body 1130 and the lid 1132. The branch channel 1108 and the main channel 1110 are defined in the housing, specifically in the body. In the example shown, the lid is transparent to enable the drawing to depict details of the channels and the optical fibers. In a practical embodiment, the lid would typically be opaque.

The branch channel 1108 accommodates part of an optical fiber that will be called the branch optical fiber. Part of a branch optical fiber 1104 is shown installed in the branch channel FIGS. 11C and 11D. The branch channel is serpentine and includes the coupling curve portion 112 that extends over part of its length. The coupling curve portion 1112 has a radius of curvature less than the critical radius of the branch optical fiber.

The main channel 1110 accommodates part of an optical fiber that will be called the main optical fiber. Part of a main optical fiber 1106 is shown installed in the main channel in FIGS. 11C and 11D. The main channel is serpentine and includes the coupling curve portion 1116 that extends over part of its length. The coupling curve portion 1116 has a radius of curvature less than the critical radius of the main optical fiber. The coupling curve portions 1112 and 1116 of the channels 1108 and 1110, respectively, curve in opposite directions and communicate over a short segment located substantially at their apices.

FIGS. 11C and 11D show the optical fiber tap 1100 with part of the branch optical fiber 1104 installed in the branch channel 1108 and part of the main optical fiber 1106 installed in the main channel 1110. The coupling curve portion 1112 of the branch channel forms the coupling curve 1114 in the branch optical fiber. The coupling curve portion 1116 of the main channel forms the coupling curve 1118 in the main optical fiber. The coupling curve 1118 formed in the main optical fiber is opposed to, and juxtaposed with, the coupling curve 1114 formed in the branch optical fiber. The juxtaposed, opposed coupling curves enable optical signals to couple laterally between the main optical fiber and the branch optical fiber.

The part of the main optical fiber 1106 installed in the main channel 1110 can be located anywhere along the length of the main optical fiber. Moreover, the main optical fiber can be inserted into the main channel without the need for access to either of its ends. This allows the optical fiber tap 1100 to be added to the main optical fiber without the need to disturb an existing installation of the main optical fiber.

The part of the branch optical fiber 1104 installed in the branch channel 1108 is located at one end of the branch optical fiber in this embodiment. In the example shown, the branch optical fiber is terminated by the anti-reflective termination 1120. The optical fiber tap additionally includes the recess 1119 defined in the body 1130. The recess communicates with the branch channel and is shaped to accommodate the anti-reflective termination. Additionally, or alternatively, the recess can accommodate an optical transceiver, such as described before. In embodiments in which reflections at the end of the branch optical fiber are tolerable, the anti-reflection termination may be omitted from the branch optical fiber and the recess may be omitted from the body.

FIGS. 11A and 11B show the body 1102 without optical fibers installed in the branch channel 1108 and the main channel 1110. The branch channel 1108 is composed of the curved portion 1122 arranged in tandem with the coupling curve portion 1112, described above. The curved portion 1122 curves in the opposite direction to the coupling curve portion 1112. The main channel 1110 includes, in order, the curved portion 1124, the coupling curve portion 1116, described above, and the curved portion 1126 arranged in tandem. The curved portions 1124 and 1126 curve in the opposite direction to the coupling curve portion 1116. Each of the curved portions 1122, 1124 and 1126 has a radius of curvature greater than the critical radius of the optical fibers to minimize the loss of the optical signal from the parts of the optical fibers located in these portions of the channels.

The branch channel 1108 and the main channel 1110 have cross-sectional shapes and dimensions that define the location of the branch optical fiber 1104 and the main optical fiber 1106, respectively, in the housing 1102. In the example shown, the channels each have a substantially V-shaped cross-sectional shape and are dimensioned to locate the surfaces of the branch optical fiber and the main optical fiber substantially flush with the major surface 1128 of the body 1130. Alternatively, the channels may have cross-sectional shapes and dimensions that locate the branch optical fiber and the main optical fiber to project slightly above the major surface 1128. Such projection enables the lid 1132, to be described further below, installed on the body to clamp the optical fibers in the channels. The branch and main channels may alternatively have a U-shaped, semi-circular, semi-elliptical, parabolic, square or other suitable cross sectional shapes, and may have cross-sectional shapes that differ from one another.

At their closest approach, the center lines of the branch channel 1108 and the main channel 1110 are separated by a distance equal to, or, slightly less than, the sum of the radii of the branch optical fiber 1104 and the main optical fiber 1106. This arrangement brings the optical fibers into contact with one another in the contact region 1136, shown in FIG. 11C and the cross-sectional view of FIG. 11E, where the lateral coupling of optical signals takes place.

The lid 1132 is affixed to the body 1130 to form the housing 1102. In one embodiment, the lid is affixed to the body by a hinge (not shown). The hinge allows the lid to be opened to enable the optical fiber 1104 and 1106 to be installed in the channels 1108 and 1110, respectively, defined in the body. The lid 1132 is held in its closed state by one or more latches (not shown).

In another embodiment, the lid 1132 is affixed to the body 1130 by latches (not shown) and is opened by releasing the latches to detach the lid from the body. In a further embodiment, the lid is supplied detached from the body. After the optical fibers 1104 and 1106 have been installed in the channels 1108 and 1110, respectively, the lid is affixed to the body using an adhesive or using fasteners, such as screws, rivets, clamps, etc.

The lid 1132 is closed after the optical fibers 1104 and 1106 have been installed in the branch channel 1108 and the main channel 1110, respectively. In its closed state, the lid forces the optical fibers 1104 and 1106 into contact with the walls of the branch channel 1108 and the main channel 1110, respectively, to cause the coupling curve portions 1112 and 1116 of the channels to bend the optical fibers to form the coupling curves 1114 and 1118 and to define the juxtaposed location of the coupling curves.

Hinges, latches, adhesives, fasteners and other means suitable for affixing the lid 1130 to the body 1130 of the optical fiber tap 1100 are known in the art, and therefore will not be described here.

In an alternative embodiment, the body 1130 constitutes the entire housing 1102, and the optical fibers 1104 and 1106 are retained in the branch channel 1108 and the main channel 1110, respectively, by means other than a lid. For example, the optical fibers may be retained in the serpentine channels by a suitable adhesive (not shown).

Instead of the lid 1132, the optical fiber tap 1100 may include a two-part lid. A two-part lid makes the optical fiber tap easier to install by enabling the optical fiber first installed in the optical fiber tap to be retained in its channel by its respective lid portion before the other optical fiber is installed.

The optical fiber tap 1100 is made by molding the body 1130 from a suitable plastic or other moldable material. Molding, as used herein, encompasses casting. The molding process additionally defines the branch channel 1108 and the main channel 1110, and optionally, the recess 1119 in the body. The lid 1132 may also be molded from plastic or another moldable material. In an exemplary embodiment, the entire housing 1102, composed of the body 1130, the lid 1132, one or more hinges (not shown) extending between the body and the lid, and one or more latches (not shown), is molded from plastic as an integral unit.

Alternatively, the body 1130 and the lid 1132 may each be composed of a material such as plastic, metal, semiconductor, glass or ceramic. The branch channel 1108 and the main channel 1110 and, optionally, the recess 1119, may be formed in the body by removing material from the body by such processes as machining, wet or dry etching or erosion.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An optical system comprising:
   an optical transceiver having an optical receiver; and
   a bi-directional optical bus having a first end, a second end, and an intermediate portion defined between the first end and the second end, the optical bus being one of an optical fiber, a buried waveguide, and a planar waveguide, wherein the optical bus defines a propagation axis extending between the first and second ends, and includes a first reflective surface located along the intermediate portion, the first reflective surface being inclined with respect to the propagation axis and operative to simultaneously direct to the optical receiver optically coupled to the intermediate portion of the optical bus, a portion of a first optical signal and a portion of a second optical signal propagating through the optical bus, the optical receiver being operative to detect a logic level based upon the relative difference in intensities between the portion of the first optical signal and the portion of the second optical signal.

2. The optical system of claim 1, wherein the first reflective surface is a portion of a facet formed in the optical fiber.

3. The optical system of claim 1, wherein the optical receiver includes a first photodetector operative to detect the first optical signal having a first frequency and a second photodetector operative to detect the second optical signal having a second frequency.

4. The optical system of claim 3, further comprising:
a first optical filter arranged between the optical fiber and the first photodetector, the first optical filter being operative to filter optical signals directed to the first photodetector such that only optical signals of the first frequency are propagated to the first photodetector.

5. The optical system of claim 1, wherein the optical bus is operative to propagate multiple frequencies of light such that at least one of wavelength diverse optical sources can provide optical signals to and wavelength diverse optical receivers can receive optical signals from the optical bus.

6. The optical system of claim 1, further comprising the optical transceiver having an optical source operative to provide the first optical signal propagating through the optical bus.

7. The optical system of claim 6, wherein the optical source is optically coupled to the optical fiber between the first end and a location at which the optical receiver is optically coupled to the optical fiber.

8. The optical system of claim 6, wherein the optical source is optically end-coupled to the optical fiber.

9. The optical system of claim 6, wherein the optical source is operative to produce the second optical signal having a frequency diversity with respect to the first optical signal.

10. The optical system of claim 9, wherein the optical transceiver is operative to output an electrical data signal.

11. The optical system of claim 10, wherein the electrical data signal is a logic "1" when the optical receiver detects an intensity of the first optical signal higher than the intensity of the second optical signal.

12. The optical system of claim 10, wherein the electrical data signal is a logic "1" when the receiver detects an intensity of the second optical signal higher than the intensity of the first optical signal.

13. The optical system of claim 6, further comprising:
a second optical source optically coupled to the bus and operative to provide the second optical signal to the bus that is frequency diverse with respect to the first optical signal.

14. The optical system of claim 6, wherein the optical bus includes a second reflective surface, the second reflective surface being inclined with respect to the propagation axis and operative to direct optical signals from the optical source to the optical bus.

15. The optical system of claim 14, wherein the optical source is offset with respect to the propagation axis of the optical bus.

16. The optical system of claim 6, further comprising:
means for directing optical signals from the optical bus to the optical receiver; and
means for directing optical signals from the optical source to the optical bus.

17. The optical system of claim 6, wherein the optical transceiver includes a housing having a base and sidewalls extending upwardly from the base, a first of the sidewalls defining an aperture, the aperture being sized and shaped for receiving the first end and at least a portion of the intermediate portion of the optical bus;
wherein the optical source is arranged within said housing such that the optical source is offset with respect to the propagation axis of the optical bus; and
wherein the optical receiver is arranged within the housing such that the optical receiver is offset with respect to the propagation axis of the optical bus.

18. The optical system of claim 6, wherein at least one of the optical source and the optical receiver is optically coupled to the optical bus via at least one of ingress and egress of photons through a sidewall of the optical bus.

19. The optical system of claim 18, wherein the at least one of the optical source and the optical receiver is optically coupled to the optical bus at a location where the optical bus is bent into an are exhibiting a radius less than a critical radius of the optical bus.

20. The optical system of claim 18, wherein the optical bus accommodates optical coupling of at least one of the optical source and the optical receiver at multiple locations along a length of the optical bus.

21. The optical system of claim 20, wherein at least one of the optical source and optical receiver are relocatable along the length of the optical bus such that optical coupling between the optical bus and the at least one of the optical source and optical receiver can occur at multiple locations.

22. The optical system of claim 1, further comprising a second optical receiver optically end-coupled to the optical bus.

23. A method for communicating optical signals comprising:
providing a bi-directional optical bus having a first end, a second end, and an intermediate portion defined between the first end and the second end, the optical bus being one of an optical fiber, a buried waveguide, and a planar waveguide;
optically coupling an optical receiver to the intermediate portion of the optical bus;
providing a first reflective surface located along the intermediate portion;
using the first reflective surface to simultaneously direct to the optical receiver, a portion of a first optical signal and a portion of a second optical signal propagating through the optical bus; and
detecting a logic level based upon the relative difference in intensities between the portion of the first optical signal and the portion of the second optical signal.

* * * * *